W. G. LINDEMANN.
CUSHION TIRE.
APPLICATION FILED NOV. 17, 1917.
1,273,887.
Patented July 30, 1918.
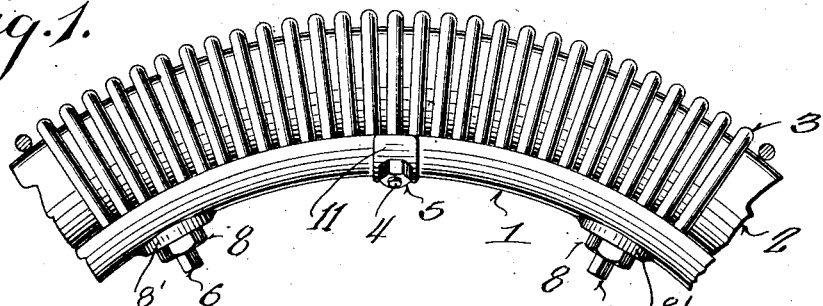
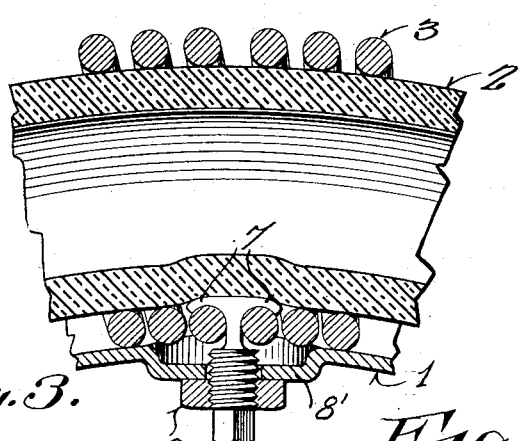
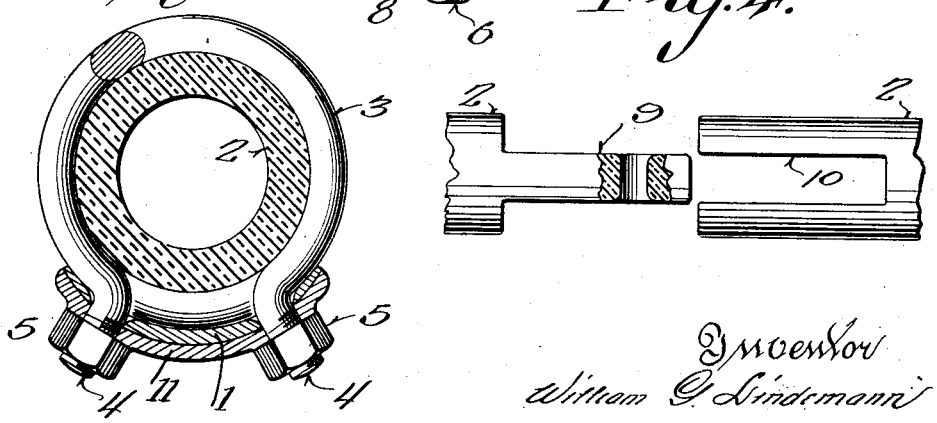

UNITED STATES PATENT OFFICE.

WILLIAM G. LINDEMANN, OF MILWAUKEE, WISCONSIN.

CUSHION-TIRE.

1,273,887.　　　　　Specification of Letters Patent.　　Patented July 30, 1918.

Application filed November 17, 1917. Serial No. 202,495.

*To all whom it may concern:*

Be it known that I, WILLIAM G. LINDEMANN, a citizen of the United States, and resident of Milwaukee, in the county of Milwaukee and State of Wisconsin, have invented certain new and useful Improvements in Cushion-Tires; and I do hereby declare that the following is a full, clear, and exact description thereof.

This invention relates to improvements in tires for automobiles and other vehicles and has for its main object to provide a practical, economical and durable substitute for the pneumatic or solid tires commonly employed to afford a cushion tread for such vehicles.

Another object is to provide a cushion tire of simple construction which can be easily assembled and attached to the rim.

The present invention relates to cushion tires employing a resilient core or body member with resilient means surrounding the same and removably secured to the rim.

The invention in one practical form in which it may be embodied is illustrated in the accompanying drawings, in which:

Figure 1 is an elevation of a portion of the tire embodying my invention.

Fig. 2 is an enlarged sectional view through the tire showing the means for anchoring the same to the rim.

Fig. 3 is a sectional view through the tire showing the manner in which I attach the ends of the spring to the rim, and Fig. 4 is a detail sectional view showing the manner in which the ends of the core or body member are matched.

Referring now more particularly to the drawings 1 is a metal rim which is adapted to be carried by the vehicle wheel. Mounted around the rim is a hollow resilient core or body member 2 which is preferably to be made of rubber. About the body member 2 is encircled a coiled spring 3 which has its ends 4 bent so as to extend through openings in the rim in which position they are held by the nuts 5. Said ends 4 of the spring are preferably disposed radially of the convolutions thereof, and the openings in the rim through which they project are transversely alined.

The rim is also provided with a longitudinal row of spaced openings which are each formed centrally of a substantially circular flattened portion 8', said flattened portions being formed by pressing the sheet metal rim inwardly. These openings are designed to receive the threaded shanks of T-shaped anchoring bolts 6, the arms 7 of the heads of which engage the convolutions of the coiled spring 3. After the anchoring bolts have been properly positioned nuts 8 are threaded on the portions of the shanks which project inwardly of the rim whereby to draw the spring 3 into rigid engagement with the rim. The frictional engagement between said substantially circular flattened portions 8' and the nuts will prevent the latter from readily becoming loosened.

In order to assemble my tire I force the body member through the coiled spring while they are both in their straight position. When this is accomplished the tongue 9 at one end of the body member is inserted into a corresponding groove 10 at its opposite end where it is held by a plug or bolt. This is then slipped over the rim member and the two ends of the coiled spring are brought together and disposed in the openings provided in the rim. The arms 7 of the anchors 6 are then inserted between the coils and twisted to engage the same, whereupon the nuts 8 are turned up thus drawing the coils tightly against the rim. It will be seen from this that a continuous tread is formed.

Inasmuch as the rim 1 is formed from light metal, it is desirable that the same be provided with a reinforcing member around the openings through which the ends 4 of the spring 3 project. Therefore I secure to the outer surface of the rim an elongated reinforcing plate 11, the same being attached thereto by brazing, welding or the like and is positioned transversely so as to surround both of said openings.

In the use of the coiled spring I am enabled to construct the body member of very light material as a large part of the strain of the load upon the tire will be taken up by the spring which not only acts as a means for protecting the body member but at the same time affords efficient traction means.

While I have shown the coils of the spring 3 spaced apart at their outer periphery, it will be readily seen that by abutting them at their innermost point this distance can be considerably decreased thereby affording greater protection to the body member 2.

What is claimed is:

A device of the class described comprising a sheet metal rim having a longitudinal row of circular flattened, nut engaging portions pressed therein, each being provided with a central bolt receiving hole, a coiled spring formed from a single piece of wire and disposed around said rim, a plurality of T-shaped anchoring bolts having their shanks threaded, each being disposed through one of said holes, their heads being engaged with the convolutions of the coiled spring, and nuts on the threaded shanks of the anchoring bolts and engaged with said flattened portions of the rim to draw the heads of said bolts theretoward.

In testimony that I claim the foregoing I have hereunto set my hand at Milwaukee, in the county of Milwaukee and State of Wisconsin.

WILLIAM G. LINDEMANN.

Copies of this patent may be obtained for five cents each, by addressing the "Commissioner of Patents, Washington, D. C."